Patented Feb. 14, 1933

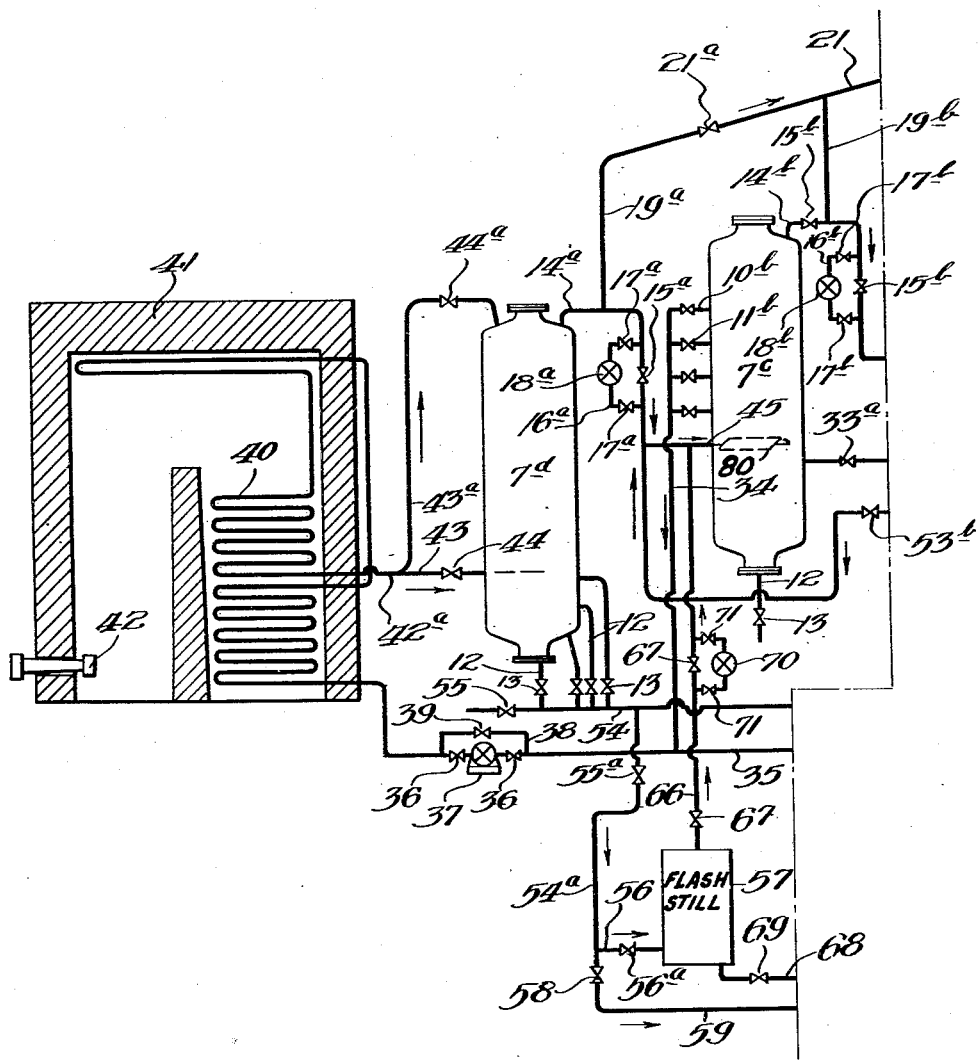

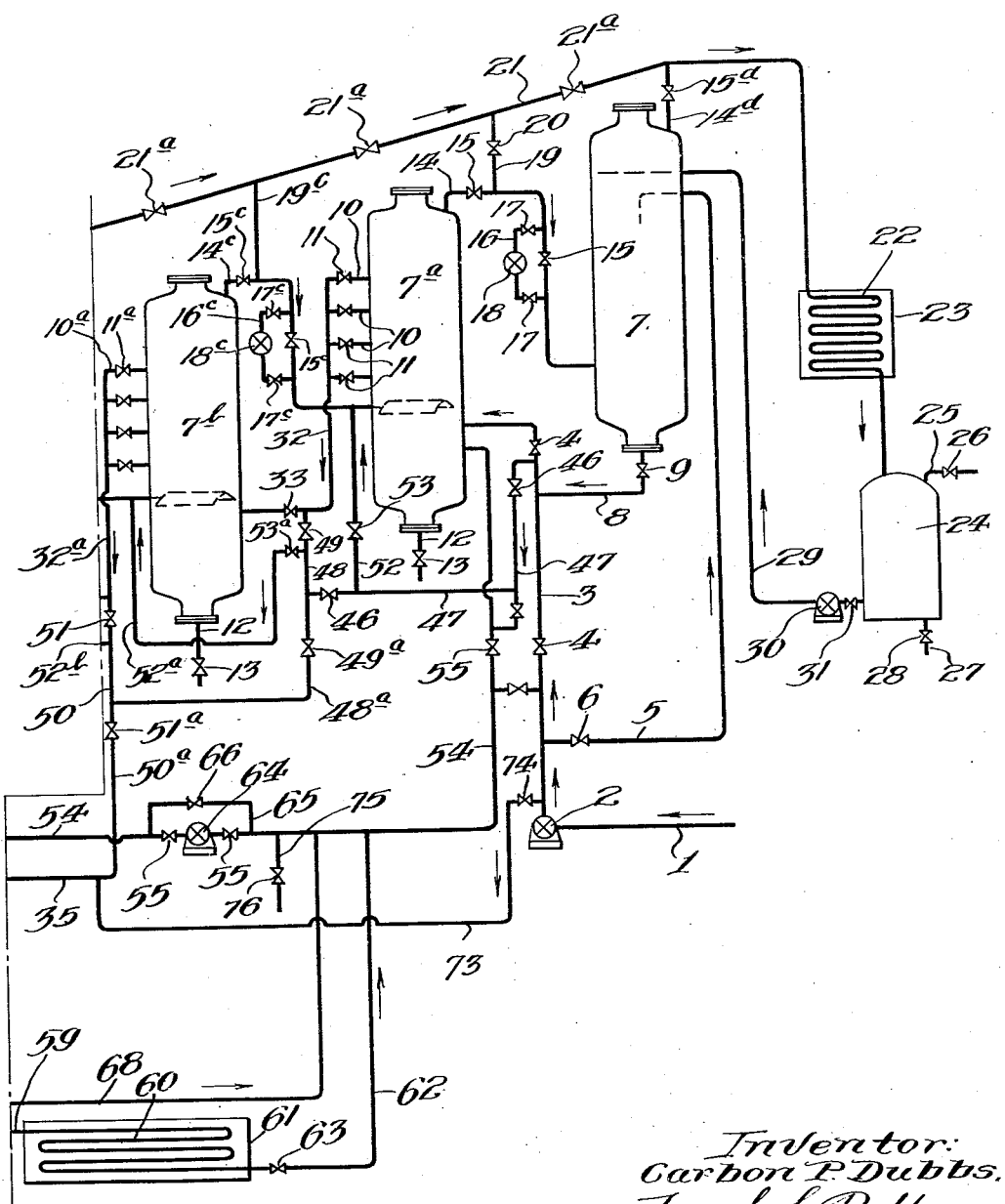

1,897,577

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

HYDROCARBON OIL CONVERSION

Application filed July 30, 1927. Serial No. 209,633.

The present invention relates to improvements in hydrocarbon oil conversion, and refers more particularly to the conversion of heavy or high boiling point range hydrocarbons to produce therefrom lower boiling point hydrocarbons suitable for commercial use, for instance, as motor fuel.

The invention is characterized by the fact that it can be operated at atmospheric pressure or under superatmospheric pressure, but in either event it is preferable that the oil be subjected to conditions of cracking temperature whereby a substantial conversion takes place.

The principal object of the present invention is to provide a process and apparatus having a wide range of flexibility, which process and apparatus are adapted to the efficient treatment of any character of charging stock including heavy crudes, topped crudes, petroleum distillates and residue, and for the production of the desired types of products.

Other objects of the invention are to provide a process and apparatus in which the oil being treated, may be fractionally distilled and subjected to a cracking or breaking up, and to a polymerization to convert the heavier hydrocarbons into lighter hydrocarbons, such lighter oil being fractionally separated as one uninterrupted process, and during such process passing the released vapors and generated gases through the liquid body, thus reducing the amount of uncondensable gases and coke; to provide a method and apparatus in which a series of chambers are employed, and in which the hydrocarbons treated are subjected to progressively increasing temperatures; to provide a method and apparatus in which the vapors and gases are subjected to progressively decreasing temperatures, the vapors and gases being preferably caused to percolate through the oil in the various chambers, advancing from those having higher temperatures to those wherein lower temperatures are maintained; to provide a method and apparatus wherein the vapors, gases and liquid are brought into intimate contact with each other in zones of reaction; to provide a process and apparatus in which the heavier products of the reaction are withdrawn and caused to be introduced into a zone of lower temperature, passing successively back through zones of increasing temperature, being brought into contact therein with the liquid, and particularly with the vapors from which said heavier products of reaction were separated in a previous reaction zone; to provide a process and apparatus wherein the character and gravity of the residue produced, can be accurately controlled and regulated; to provide a process and apparatus of this general character in which by controlling the conditions of operation, the residue produced may comprise a liquid, a semi-liquid, a semi-solid or solid, that is the conditions of operation may be controlled so as to produce liquid residue or non-liquid residue.

One of the features of the present invention, resides in controlling the flow of oil from one pool to a succeeding pool of higher temperature by maintaining each pool at a successively higher level, thus utilizing the liquid head produced thereby to force the oil from one pool to a succeeding pool at lower elevation, without the aid of a pump.

The utility of the invention, as well as other objects and advantages will be hereinafter more clearly brought out.

Figures 1 and 1a in the drawings, taken together, show a diagrammatic side elevational view of apparatus in which the invention may be carried out.

Referring more in detail to the drawings, 1 designates a charging stock feed line drawing charging stock from suitable source of supply (not shown). A pump 2 may be interposed in the connection between the feed line 1 and feed line 3 in which latter line may be interposed the valves 4. All or regulated portions of the charging stock may be diverted through the line 5 controlled by the valve 6 and introduced into the first of a series of serially connected chambers 7, 7a, 7b and 7c. If the charging stock is introduced to the chamber 7, it is utilized as a medium for condensing the heavier fractions of vapors introduced thereto, as will be hereinafter more particularly brought out.

The condensate as well as unvaporized charging stock may be withdrawn through the line 8 controlled by the valve 9 communicating with the inlet line 3. The charging line 3 introduces the charge of oil into the lower portion of the chamber 7a where it is permitted to build up into a pool, the height of which is regulated by the drawoff lines 10 controlled by the valves 11. It is to be noted that the chambers 7, 7a, 7b, 7c and 7d are located at successively lower levels, the purpose of which will be hereinafter more particularly brought out.

Each of the chambers 7a, 7b and 7c may be provided with drains 12 controlled by valves 13. Vapors released in chamber 7a, may be withdrawn through the line 14 controlled by valves 15, and may be introduced to the chamber 7 where they come in contact with the incoming charging stock as heretofore described. A by-pass 16 controlled by valves 17 and in which is interposed a pump 18, may be provided in the line 14 for the purpose of placing pressure on the vapors, if desired. A branch 19 controlled by valve 20, may be used for diverting the vapors directly into a vapor header 21, if it is not desired to pass them through chamber 7. The vapor header 21 communicates with condenser coil 22 mounted in condenser box 23, where the vapors are condensed, from which they pass to and are collected in receiver 24 which may be provided with gas relief line 25 controlled by valve 26, and with liquid drawoff line 27 controlled by valve 28. Provision is made for recirculating regulated quantities of the liquid distillate collecting in the receiver 24 comprising a return line 29 in which may be interposed the pump 30 and valve 31, the line 29 communicating with the first chamber 7.

The unvaporized oil flowing through the discharge pipe 10 from the chamber 7a may be introduced to the line 32 in which may be interposed a valve 33, which line 32 communicates with the chamber 7b, thus introducing oil overflowing from chamber 7a to chamber 7b.

As a feature of the invention, it is to be noted that the chamber 7a is located at a higher level than chamber 7b so that the head of liquid therein will be sufficient to force oil from 7a to 7b without the aid of a pump. Chamber 7b is provided with drawoff lines 10a controlled by valves 11a, which in turn communicate with return line 32a controlled by valve 33a, the line 32a discharging said oil into the chamber 7c. The chamber 7c is provided with drawoff lines 10b controlled by valves 11b, which in turn communicate with the line 34. The line 34 communicates directly with a main charging line 35 in which may be interposed valves 36 and pump 37. A by-pass 38 controlled by valve 39 communicates with main charging line 35 whereby the pump 37 may be by-passed, if desired. The main charging line 35 communicates with a heating coil 40 mounted in furnace 41, the oil passing through said coil 40 being subjected to gases of combustion generated by the burner 42. The oil after being raised to the desired temperature while passing through the coil 40, may be discharged into the transfer line 42a which may be provided with two branches 43 and 43a controlled respectively by valves 44 and 44a, both of which lines 43 and 43a communicate with the chamber 7d. The heated hydrocarbons being introduced to the chamber 7d may separate into vaporous and non-vaporous products of reaction, the vapors being withdrawn through the line 14a in which may be interposed the valve 15a. A by-pass 16a controlled by valves 17a and in which may be interposed a pump 18a, may be provided for the purpose of interposing a pressure on the vapors passing through the line 14a. A branch 19a may communicate with the vapor line 14a, the branch 19a communicating with the vapor header 21 in which may be interposed valves 21a.

The vapor line 14a may introduce vapors through the line 45 into the chamber 7c where said vapors physically commingle and come into intimate contact with the oil maintained in the pool therein. The level of the pool is preferably maintained above the point of introduction of the vapors through line 45, thereby causing the vapors to percolate through the oil. By this arrangement, condensation of the heavier fractions of the vapors takes place with vaporization of the lighter constituents of the oil in the pool. Vapors released in the chamber 7c may be withdrawn through the vapor line 14b controlled by valves 15b. A by-pass 16b controlled by valves 17b and in which may be interposed a pump 18b, may be provided for the purpose of interposing a pressure on the vapors passing through the line 14b. The vapor line 14b introduces the vapors into the chamber 7b where an action similar to the action described in chamber 7c may take place.

Vapors from the chamber 7b pass out through vapor line 14c in which may be interposed the valves 15c. A by-pass 16c controlled by valves 17c and in which is interposed a pump 18c may be provided for the purpose of imposing a pump pressure on the vapors passing through the line 14c. The vapor line 14c delivers vapors into the chamber 7a where a similar action to that described, as taking place in chambers 7b and 7c, takes place, that is, the vapors are brought into intimate physical contact with the oil maintained in the pool in the chamber 7a.

Vapors from chamber 7a, may be withdrawn through the vapor line 14 as heretofore described. Branches 19b and 19c may be provided, communicating respectively with vapor lines 14b and 14c on one end, and the vapor header 21 on the other.

From the foregoing, it will be apparent that the charging stock and condensate successively passes from one pool to a succeeding pool of higher temperature under the influence of a liquid head of oil maintained at a higher level in a preceding pool. Simultaneously, vapors from a preceding pool are caused to pass successively through succeeding pools and through zones of progressively decreasing temperature, with the result that the vapors are given a thorough scrubbing, due to having been forced to percolate through successive pools of oil, causing the heavier fractions of the vapors to condense. At the same time, the heat imparted to the charging stock will vaporize the lighter constituents thereof, which lighter constituents will also be subjected to scrubbing action in a succeeding pool. Thus, the vapors withdrawn from the chamber 7a through the vapor line 14 or chamber 7 through the vapor line 14d controlled by valve 15d will have been subjected to conditions of efficient fractionation.

It may be found necessary or desirable in the operation of the process to cause the vapors to by-pass any one or more of the chambers 7, 7a, 7b or 7c, which may be accomplished by obvious manipulation of valves 21a in the vapor header 21, and manipulation of the valves 15, 15a, 15b and 15c in the vapor lines 14, 14a, 14b and 14c. In the same manner, oil passing from one pool to a succeeding pool of increased temperature, may by-pass any of the chambers 7a, 7b and 7c by manipulation of valves as follows: Assume it is desired to by-pass the chamber 7a. The valves 46 in line 47 may be opened, and the valve 4 in line 3 may be closed. Line 47 communicates with line 48 in which may be interposed a valve 49 communicating with the return line 32 leading direct to the chamber 7b. In a similar manner, chamber 7b may be by-passed by causing the oil to pass through a continuation 48a of line 48 controlled by valve 49a, which communicates with the line 50 controlled by the valve 51. Line 50 communicates with the return line 32a. A continuation 50a controlled by valve 51a in line 50 permits by-passing of the chamber 7c. It is to be understood of course, that where the chamber 7a is by-passed, the line 48 is used to feed the charge from chamber 7, or direct from storage to the line 32, whereas if chamber 7a is in use, and chamber 7b is being by-passed, line 48 is used to remove oil from line 32, valve 33 being closed, passing same to continuation 48a. The same explanation may be made for the line 50.

A branch 52 controlled by valve 53 may be used for diverting a portion of the oil from line 47 into the vapor line 14c, whereby admixture between the oil and vapors takes place just prior to being introduced to the chamber 7a. Similarly, line 52a controlled by valve 53a, may communicate with line 48 for diverting a portion of the oil to the vapor line 14b. Similarly line 52b controlled by valve 53b may divert oil from line 50 into the vapor line 45.

Any or all of the chambers 7, 7a, 7b, 7c and 7d may be externally unheated if found desirable, or may be externally heated only for the purpose of maintaining the temperature in any one chamber the same as the temperature to which the oil was heated in a preceding chamber. If externally unheated, the chambers may be preferably insulated to prevent loss of heat by radiation. All of the connecting lines may also be lagged to prevent loss of heat by radiation. The vapor pumps 18, 18a, 18b, and 18c may be used in the preferred embodiment of the invention to overcome frictional resistance, due to the head of oil maintained in the succeeding chambers, and to prevent said oil from backing up through the vapor lines.

It is important to note that the oil being introduced into each of the chambers, should be introduced at a point at which a volume of oil will be present in the chamber sufficient to permit separation of heavy hydrocarbons in semi-solid or solid form.

In use and operation, the charging stock is caused to pass successively through zones of progressively increasing temperature counter-current to the flow of the vapors with which said charging stock is brought into physical contact. In each of the chambers 7, 7a, 7b and 7c, the vapors from a preceding chamber are caused to percolate through a pool of oil maintained therein thus scrubbing the vapors and assisting in their fractionation, while at the same time imparting heat to the oil, and vaporizing the lighter fractions. This repeated scrubbing of the vapors by causing same to percolate through the pools of oil, imparts beneficial characteristics to the final products, for instance, one of the desirable characteristics imparted to the final product, is that it makes it easier to subsequently refine.

The depth of liquid maintained in each of the chambers 7, 7a, 7b, 7c and 7d is controlled by manipulation of the valves in the respective drawoff lines. Regulation of the depth of the pool of oil in each chamber, regulates the degree of percolation, which thus controls the fractionation, heat exchange, reaction, and to a certain extent, the character of the final products. In this manner, the preheated charging stock combines with the condensate in each chamber, and passing successively from chamber to chamber, the portions thereof remaining unvaporized, finally reach the heating coil 40.

As a feature of the invention, after the plant is in operation, the non-vaporous residue produced in chamber 7d, may be withdrawn through any of the drawoff lines 12 controlled by valves 13 and introduced into the header 54 controlled by valve 55 from which header the residue may be passed into the branch 54a controlled by valve 55a. A branch 56 controlled by valve 56a may be used for the purpose of passing said residue into a flash chamber designated diagrammatically at 57. Or the valve 56a may be closed and the flash chamber 57 by-passed by opening the valve 58 in line 59 through which the oil is passed through cooler 60 in cooler box 61, from which the cooled residue may be passed through the line 62 in which may be interposed the valve 63. The line 62 it is to be noted, communicates with the residue header 54. The residue header is provided with pump 64 and by-pass 65 therefor, controlled by the valve 66. When the residue is passed through lines 54a and 56 into the flash chamber 57, vaporization takes place, the vapors being withdrawn through the line 66 controlled by valve 67, and the non-vaporous residue being withdrawn through the line 68 controlled by valve 69, the line 68 communicating with the residue header 54. The line 66 may communicate with the vapor line 45. Vapor pump 70 controlled by valves 71 in the by-pass line 72 may be utilized for the purpose of imposing pressure on the vapors passing through line 66.

It may be desirable in some instances, to divert portions of the charging stock from the feed line 1 directly into the charging header 35 for passage to the heating coil 40. For this purpose, the line 73 controlled by valve 74 communicates between the charging line 3 and charging header 35. A drain 75 controlled by valve 76 may be connected with the residue header 54.

In use and operation, the non-vaporous residue is withdrawn from chamber 7d before it has had an opportunity to be converted to such an extent that substantial quantities of coke would be formed. These conditions may be maintained by controlling the degree of reaction in the heating coil 40 and chamber 7d, and by regulating the level of the non-vaporous residue in chamber 7d. The hot non-vaporous fractions from chamber 7d may be introduced directly into chamber 7a by closing valves 55a and opening the proper valves 55, said hot non-vaporous residue being thereby subjected to cooling action due to physical commingling with the cooler charging stock introduced through lines 3 or 8 to the chamber 7a. This cooling action arrests any further reaction which might take place in the residue, and keeps the latter relatively free from heavy pitch, coke and sludge. Furthermore, by commingling with the relatively light vapors in chamber 7a, the residue is thereby subjected to a diluting action, which tends to separate the lighter liquid portions of residue from the heavier pitch or coke-containing portions, the latter depositing at the bottom of chamber 7a and may be left to accumulate or may be withdrawn continuously or intermittently through the line 12, valve 13 being open.

It is to be noted in the preferred form of operation, that the residue from chamber 7d is not introduced into the chamber 7 in which chamber the finishing action on the vapors is preferably allowed to take place. It is understood however, should it be desired, the residue may be introduced to chamber 7, (by means not shown) or to any of the other chambers 7b or 7c, instead of the chamber 7a as described. By carrying out the operation describing wherein the residue is introduced into the chamber 7a, the residue is freed from the heavier pitch and coke-forming particles in chamber 7a, the liquid portion thereof combining with the raw charging stock and condensate passing out therefrom through the line 10 to one of the next succeeding chambers. In this manner the heavy fractions contained in the residue, separate from the relatively lighter portions of the residue while passing through the succession of chambers, and the oil directed from chamber 7c to the heating coil 40 is relatively clean.

The entire plant may be operated under atmospheric pressure, that is, only such pressure as is necessary to overcome frictional resistance being maintained, certain parts of the plant may be maintained under superatmospheric pressure, which may be uniform, or differential pressures may be employed. When the heating coil 40 and reaction chamber 7d are operated under superatmospheric pressure, it may be desirable to flash the residue withdrawn through the drawoff line 12 before it is returned to the chamber 7a, in which event the valves 55 are closed, and the residue is diverted through the lines 54a and 56 into the flash chamber 57, the vapors released in flashing due to a reduction in pressure while passing through the valves 55a and/or 56a being removed through line 66 and returned to chamber 7c or to anyone of the other chambers. The selection of the chamber to which the vapors produced in the flashing of the residue are returned, is governed by the characteristics of the vapors passing from one chamber to another, that is, the flashed vapors should be introduced to that chamber to which is being directed vapors having substantially similar characteristics.

In this operation, only the heavier portion of the residuum withdrawn from reaction chamber 7d is returned to the chamber 7a in liquid form. It may be desirable in some instances, to subject the residue withdrawn through the line 54a to a cooling action before it is passed to the chamber 7a. To accomplish this, the valves 55 and 56a may be closed, and the valves 58 and 63 in lines 59 and 62 may be opened, thus causing the hot residue to pass through the cooler 60.

The most desirable method of operating the plant described in the foregoing specification and illustrated in the drawings, will of course, depend upon the kind of charging stock being treated, and the types of products desired. Where it is desired to produce a normal yield of overhead products to be condensed as motor fuel, and it is further desired to produce a quantity of liquid residue for use as fuel or the like, the operation may be carried out as follows: The charging stock is preferably introduced into and passed through the chambers where no residue from reaction chamber 7d is passed, for instance, the charging stock may be introduced by the proper manipulation of valves and pumps shown, into the chamber 7b through lines 3, 47, 48 and 32, and passed successively as heretofore described through the chamber 7c, heating coil 40 and reaction chamber 7d. The residue from reaction chamber 7d will then be introduced into the chamber 7a wherein it will be subjected to the scrubbing of the relatively cool vapors therein, which will cause separation of the heavy pitch carrying fractions, and dilution of the residue with the relatively light condensate, resulting in the production of a fluid residue containing substantially no coke or sludge.

It is understood of course, that the charging stock and the residue may be passed through any number of chambers. The residue in any chamber being heavy, may tend to settle to the bottom, in which event, having been purified in a preceding chamber, it may be withdrawn therefrom through line 12 controlled by valve 13.

In the method of operation described, it is preferable to regulate the fractionation of the vapors in the series of chambers 7c, 7b, 7a and 7 in such a manner that a greater degree of fractionation is effected in the chambers through which the charging stock is passed, only a relatively small degree of fractionation and condensation being affected in the chambers where residuum is purified. The purpose of this is to decrease the portion of condensate used in the purification and dilution of the residue.

Another preferred method of operation comprises producing substantially no liquid residue from the process, and in this operation, the residuum withdrawn from the chamber 7d, is only an intermediate product. In this operation, the residue is returned into and through the chambers 7a, 7b and 7c together with the charging stock. Deposition and separation of coke and pitch from the residue takes place in the chambers 7a, 7b and 7c, and all portions of the residue not separated in these chambers in the form of coke or pitch, is returned with the charging stock and condensate from each chamber to the next preceding higher temperature chamber, and eventually through heating coil 40 to the reaction chamber 7d, this operation being continued until substantially all of the charging stock has been converted into two products, namely an overhead vaporous product, which when condensed, has commercial value as motor fuel, and a coke-like product, the operation being continued until the chambers are filled with solid residue.

It is very important to note that the vapors from the preceding chamber are introduced into a pool in a succeeding chamber in such a manner as to prevent any severe agitation of the body of oil in that chamber. To accomplish this, an umbrella shaped shield 80 may be provided immediately adjacent the discharge from the vapor line as illustrated diagrammatically in the drawings.

It will be apparent from the foregoing description that the process and apparatus of the present invention have a maximum of flexibility, permitting the use of any type of charging stock and the production of any types of products within a wide range by regulation of the conditions of operation.

I intentionally do not wish to limit myself to any particular temperatures or pressures or yields, or to the type of charging stock and type of product which may be produced, as they may vary widely within the scope of the invention. Any of the chambers may be cut out of operation, and by-passed by means of the valves in lines illustrated and described. The charging stock, and the residuum from the reaction chamber 7d may be passed through the same or separate chambers, and the vapors may or may not be caused to percolate through any one of these chambers according to the result desired. For instance, while I have heretofore described the percolation of the vapors through the chambers where the residuum is passed without mingling with the charging stock, it is understood that this is not necessary, and the vapors may not be passed through said chambers, which would then be used for coke separating chambers.

I claim as my invention:

In an oil cracking process of the character in which the oil is subjected to pressure distillation in a pressure distillation zone, vapors and unvaporized oil separately removed from the pressure distillation zone, the unvaporized oil subjected to further distillation in a zone of reduced pressure, the improvement which comprises maintaining a plurality of serially communicating bodies of charging oil for the process, supplying fresh charging oil to the body at one end of the series and supplying oil from the body at the other end of the series to the zone of pressure distillation, passing vapors released from the unvaporized oil in said zone of reduced pressure in physical contact with certain of said oil bodies and introducing liquid oil products unvaporized in said zone of reduced pressure into the liquid oil flowing through said serially communicating bodies to be again supplied to the zone of pressure distillation.

In testimony whereof I affix my signature.

CARBON P. DUBBS.